United States Patent
Milli

(10) Patent No.: US 10,092,915 B2
(45) Date of Patent: Oct. 9, 2018

(54) AIR SPRAY PAINTING APPARATUS

(71) Applicant: EUROSIDER S.A.S. DI MILLI OTTAVIO & C., Grosseto (IT)

(72) Inventor: Ottavio Milli, Grosseto (IT)

(73) Assignee: EUROSIDER S.A.S. DI MILLI OTTAVIO & C., Grosseto (IT)

( * ) Notice: Subject to any disclaimer, the term of this patent is extended or adjusted under 35 U.S.C. 154(b) by 370 days.

(21) Appl. No.: 14/895,146

(22) PCT Filed: May 30, 2014

(86) PCT No.: PCT/IB2014/000895
§ 371 (c)(1),
(2) Date: Dec. 1, 2015

(87) PCT Pub. No.: WO2014/195779
PCT Pub. Date: Dec. 11, 2014

(65) Prior Publication Data
US 2016/0082449 A1 Mar. 24, 2016

(30) Foreign Application Priority Data
Jun. 3, 2013 (IT) ................. FI2013A0133

(51) Int. Cl.
*B05B 5/03* (2006.01)
*B05B 5/10* (2006.01)
(Continued)

(52) U.S. Cl.
CPC ............... *B05B 5/001* (2013.01); *B05B 5/03* (2013.01); *B05B 5/10* (2013.01); *B05B 7/0815* (2013.01);
(Continued)

(58) Field of Classification Search
CPC .......... B05B 5/001; B05B 5/03; B05B 5/032; B05B 5/10; B05B 7/0815; B05B 7/1613;
(Continued)

(56) References Cited

U.S. PATENT DOCUMENTS 2,267,264 A * 12/1941 Bland .................. B05B 7/1613
392/492
4,106,697 A * 8/1978 Sickles .................. B05B 5/043
239/291

(Continued)

FOREIGN PATENT DOCUMENTS

| EP | 1 258 279 A2 | 11/2002 |
| WO | 2009/056950 A1 | 5/2009 |
| WO | 2014/057508 A1 | 4/2014 |

OTHER PUBLICATIONS

International Search Report, dated Oct. 16, 2014, from corresponding PCT Application.

*Primary Examiner* — Darren W Gorman
(74) *Attorney, Agent, or Firm* — Young & Thompson

(57) ABSTRACT

An air spray painting apparatus for sending a fan of atomized paint spray via a first entrainment flow of carrier fluid and of a second flow of carrier fluid, separate from the first entrainment flow and capable of forming the spray fan, includes electrical heating elements for heating to one and the same temperature the first and second flows of carrier fluid, and a unit for regulation and control of the heating elements.

18 Claims, 6 Drawing Sheets

(51) Int. Cl.
  *B05B 7/08* (2006.01)
  *B05B 7/16* (2006.01)
  *B05B 5/00* (2006.01)
  *B01D 53/22* (2006.01)
  *B05B 7/24* (2006.01)
  *B01D 53/047* (2006.01)

(52) U.S. Cl.
  CPC .......... *B05B 7/1613* (2013.01); *B01D 53/047* (2013.01); *B01D 53/22* (2013.01); *B01D 2257/70* (2013.01); *B01D 2257/80* (2013.01); *B01D 2258/06* (2013.01); *B05B 5/032* (2013.01); *B05B 7/2491* (2013.01)

(58) Field of Classification Search
  CPC ... B05B 7/1626; B05B 7/1633; B05B 7/2491; B01D 53/047; B01D 53/22; B01D 2257/70; B01D 2257/80; B01D 2258/06
  See application file for complete search history.

(56) References Cited

U.S. PATENT DOCUMENTS

| | | | | |
|---|---|---|---|---|
| 5,214,740 | A | * | 5/1993 | Carroll .................... B05B 7/162 239/135 |
| 5,478,014 | A | * | 12/1995 | Hynds ...................... B05B 1/28 239/135 |
| 5,558,276 | A | * | 9/1996 | Barrett .................... B05B 7/066 137/625.48 |
| 5,725,154 | A | * | 3/1998 | Jackson .................. B08B 3/026 239/135 |
| 2008/0029624 | A1 | * | 2/2008 | Shkolnikov ............... B05B 5/10 239/690 |
| 2011/0137268 | A1 | | 6/2011 | Thomason et al. |
| 2011/0202019 | A1 | | 8/2011 | Cooper et al. |
| 2012/0173028 | A1 | * | 7/2012 | Wui ......................... A61L 9/14 700/283 |

* cited by examiner

AIR SPRAY PAINTING APPARATUS

SECTOR OF THE INVENTION

The invention relates to an apparatus for automatic systems for air spray painting, in particular electrostatic painting with liquid paint that exploits the use of a carrier fluid constituted by air deprived of undesirable substances, together with ionization and heat conditioning of said carrier fluid.

In greater detail, the invention regards a method and a painting apparatus that uses as paint-carrier fluid a mixture of modified air rich in nitrogen, oxygen, and argon continuously obtained from compressed air during painting.

The operating steps of spray painting envisage in summary atomization of the paint and sending of the atomized and electrostatically charged paint onto the substrate to be painted.

A first drawback of the systems of a known type arises in the painting step, in particular in robotized systems that use as dispensers air guns or airmix guns or rotary-bell atomizers, in particular electrostatic-painting systems.

In all these cases, the dispensers have a spraying end where there is located a first outlet for the carrier fluid (constituted by a single nozzle or sets of nozzles) set centrally and designed for atomization of the paint and a second outlet for just the carrier fluid for formation of the spray fan, constituted by nozzles arranged for example around the outlet for the atomized paint.

In these systems, one of the factors that currently do not enable in all cases a satisfactory uniformity of the thicknesses of the film of paint to be achieved is the difficulty of maintaining the viscosity of the paint constant as the ambient temperature varies. This problem imposes on the user the change of the percentages of solvents both in the case of water-based paint and in the case of solvent-based paint in order to prevent non-uniformity of the thicknesses, paint runs, and the "orange peel" effect. Obviously, this problem also imposes machine stoppages, production rejects owing to the non-uniformity of the thicknesses, and other problems as mentioned above.

A further drawback of the known systems is represented by the fact that the compressed air used entrains along with it elements that are detrimental to a perfect distribution, penetration, and spreading of the paint on the substrates to be painted, such as for example, humidity, particles of hydrocarbons due to compression of the air, and particles in suspension present in atmospheric air. Even though the operation of painting is carried out in purposely provided booths or protected environments, the substrates to be painted undergo the influence of the relative humidity of the environment. This problem is much felt in so far as it gives rise to microbubbles that form between the substrate and the film of paint, and in time cracks may arise in the film of paint itself, with consequent problems of quality and detachment of the film itself.

In this connection, it should in fact be recalled that, according to the reference tables of the U.S. International Standard Atmosphere, the environmental air is made up as appears in the table below.

TABLE A

Ambient Air Specification (U.S. International Standard Atmosphere)

| Substance | Symbol | Value | Unit |
|---|---|---|---|
| Nitrogen | $N_2$ | 78.080 | vol. % |
| Oxygen | $O_2$ | 20.944 | vol. % |
| Argon | Ar | 0.934 | vol. % |
| Carbon Dioxide | $CO_2$ | 350/360 | ppmV |
| Neon | Ne | 16.1 | ppmV |
| Helium | He | 4.6 | ppmV |
| Kripton | Kr | 1.08 | ppmV |
| Xenon | Xe | 0.08 | ppmV |
| Methane | $CH_4$ | 2.2 | ppmV |
| Hydrogen | $H_2$ | 0.5 | ppmV |
| Nitrogen Protoxide | $N_2O$ | 0.3 | ppmV |
| Carbon Monoxide | CO | 0.2 | ppmV |
| Ozone | $O_3$ | 0.04 | ppmV |
| Ammonia | $NH_3$ | 4 | ppbV |
| Sulphur Dioxide | $SO_x$ | 1.7 | ppbV |
| Nitrogen Oxide | $NO_x$ | 1.5 | ppbV |
| Hydrogen Sulphide | $H_2S$ | 0.05 | ppbV |
| Total Organics (other than Methane) | | <10 | ppmV |
| Other Acid Gases (HCl, etc.) | | <0.1 | ppmV |
| Dust | | 5 | $mg/Nm^3$ |
| Water | $H_2O$ | <65 | $g/Nm^3$ |

From the above premises, there follow the problems typical of conventional painting that uses untreated air as carrier fluid for the atomization and sending of the spray fan onto the substrate.

Contamination of humidity, vesicular pollution of the hydrocarbon residue, as likewise oily organic substances, moreover entail as consequence the non-homogeneity of the paint applied and the unevenness of the thicknesses with consequent difficulty of spreading of the paint.

Moreover typical of electrostatic painting is formation, in the corners or at the ends of holes present in the product undergoing painting, of the Faraday-cage effect, which does not enable uniformity or perfect distribution, penetration and spreading of the paint, in certain cases causing absence of paint product, such as, for example, in the corners or on fins typical of electric motors or of heating bodies such as radiators or components of electrical household appliances and metalwork in general.

There are then known the problems in systems of painting with nanometric paints that use as thrust carrier traditional compressed air, which entrains along with it the pollutant elements (amongst which hydrocarbon particles, water particles, and pollutant dust of various nature), which render a perfect distribution, penetration, and spreading of the paint on the surfaces difficult.

In spite of all the aforesaid drawbacks, the known systems in any case use, as paint-carrier fluid, merely compressed air even thought it entrains along with it the particles of humidity, particles of oil vapours, and volatile particles present in the atmosphere, thus causing the problems listed above.

OBJECT OF THE INVENTION

A first object of the present invention is hence to provide an apparatus and a method for air spray painting, airmix painting, or rotary-bell painting, preferably of the electrostatic type, with liquid or powder paint that will be able to keep the viscosity of the paint to be sprayed constant and that will be free from the aforesaid drawbacks of the known systems described above.

SUMMARY OF THE INVENTION

The above and further purposes have been achieved with a method and an apparatus for electrostatic painting by means of a spray fan of paint atomized by a first flow of carrier fluid for entraining the paint and a second flow of carrier fluid, separate from said first entrainment flow, for confining the spray fan externally, wherein electrical heating means are provided for heating in a regulated and controlled way at one and the same temperature both flows of carrier fluid.

A further aspect of the invention regards a painting system that envisages the possibility of ionizing the two preheated flows separately.

According to a further aspect of the invention, there is envisaged the use as carrier liquid, of a mixture of nitrogen, oxygen and argon obtained continuously, during painting, from modified compressed air.

In greater detail, the air is "modified" in the sense that, starting from the natural composition of ambient air, in order to implement the invention, the air is deprived of the undesirable substances present in the natural composition, thus obtaining a mixture exclusively made up of nitrogen, oxygen, and argon in the preferred percentages indicated hereinafter, which favour also a synergistic effect with the ionization and heat conditioning of the carrier fluid described hereinafter.

As a preferred solution, said mixture is obtained with hollow-fibre osmotic-separation membrane means or via carbon molecular sieve (CMS) with a pressure-swing-absorption (PSA) system.

A first advantage of the invention lies in the fact that the apparatus produces a fluidifying effect on the paint such as to reduce the need to use solvents, with consequent marked abatement of the emissions into the atmosphere. Moreover, the constancy of temperature leads to a reduction of the pressure necessary for the thrust of the paint, with the effect of reducing the overspray. This causes reductions of volatile organic compounds (VOC) and marked reductions in the costs of maintenance of the filters in the booths and more solvent for the operators. In summary, in addition to the advantages set forth above, the apparatus has in use a relatively low environmental impact as compared to known systems.

A second advantage is represented by the fact that the mixture used as carrier fluid is obtained by air modified in nitrogen/oxygen/argon and is substantially anhydrous, and hence free from humidity and hydrocarbon particles that are at the root of vesicular pollution of painting products.

A further advantage is represented by the fact that, since the mixture of nitrogen/oxygen/argon is faster, there is created a greater impact of the paint on the products that means better grip and spreading of the paint, and on the fan there is impresses a perfect atomization without any dispersion at the ends thereof, thus limiting the overspray effect, i.e., the effect of dispersion of the paint-spray fan. This advantage is particularly felt in the case of robotized systems since it reduces the negative effect involved in the movement of paint spray guns.

Yet a further advantage is represented by the fact that the apparatus according to the invention stabilizes the temperature at the value that is most suited to the painting process according to the characteristics of the paint, whether it is solvent-based or water-based.

Yet a further advantage is represented by the fact that the apparatus of the invention can be applied to traditional automatic painting systems of the anthropomorphic-robot type or systems of various types that are present on the automation market.

LIST OF THE DRAWINGS

The above and further advantages will be better understood by any person skilled in the branch from the ensuing description and from the annexed drawings, which are provided by way of non-limiting example and in which.

DETAILED DESCRIPTION

Figure 1:
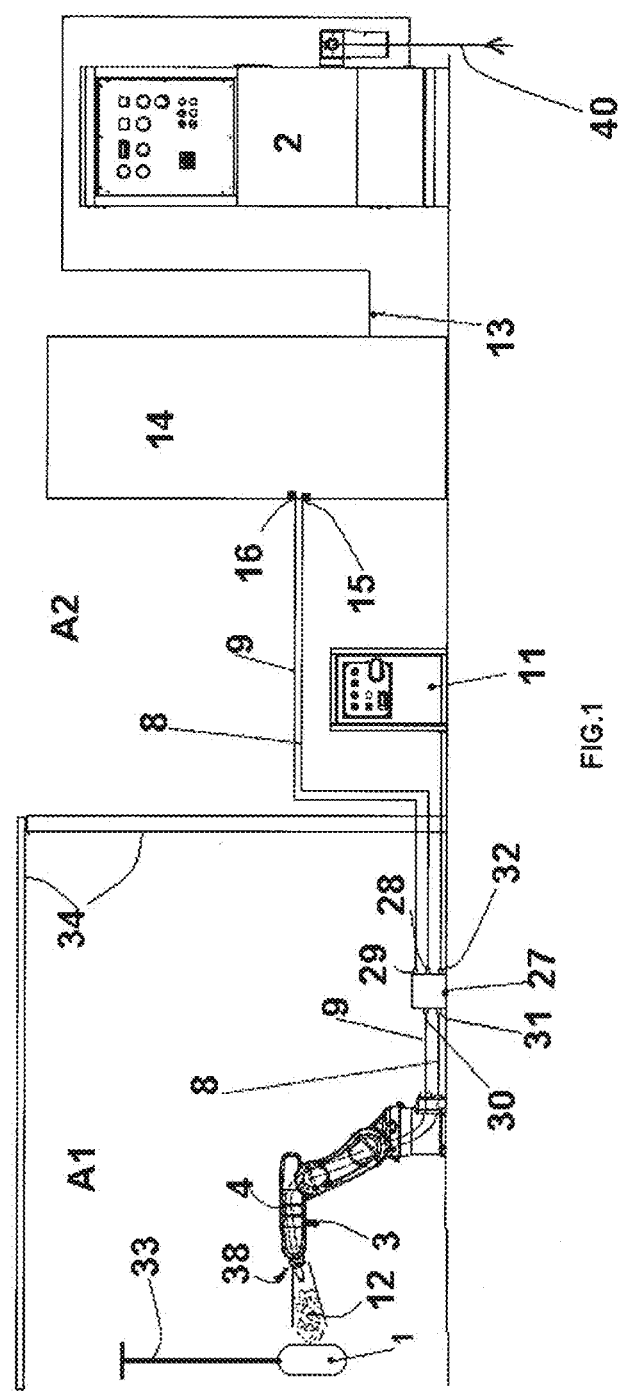
FIG. 1 is a schematic illustration of an apparatus according to the invention.

With reference to the drawings, described hereinafter is an apparatus for electrostatic painting of substrates 1 arranged in a painting area A1, for example substrates conveyed by a robotized conveying system 33 within a painting tunnel closed by walls 34 that separate it from an external area A2.

Installed in the external area A2 is a generator of carrier fluid 2, comprising, for example, hollow-fibre separation membranes and/or PSA separation systems for modifying an incoming flow 40 of compressed ambient air.

Preferably, the carrier fluid is constituted by a mixture made up of nitrogen in a range of 80-98%, oxygen in a range 1-19%, and argon in a range 1-2% obtained by continuous separation starting from a flow of compressed air taken in from the environment deprived of residual substances not comprised in the composition appearing in the table given above.

The generator 2 is operatively connected to a unit 14 for regulation and control of the pressure of the fluid, which receives via a duct 13 the flow of carrier fluid generated and makes available at least two independent outlets 15, 16 for the carrier fluid at pressures P1, P2 controlled independently.

Starting from the outlets 15, 16 are two separate ducts 8, 9, which convey the flows up to a dispenser or gun, 4 located in the painting area A1.

Figure 7:
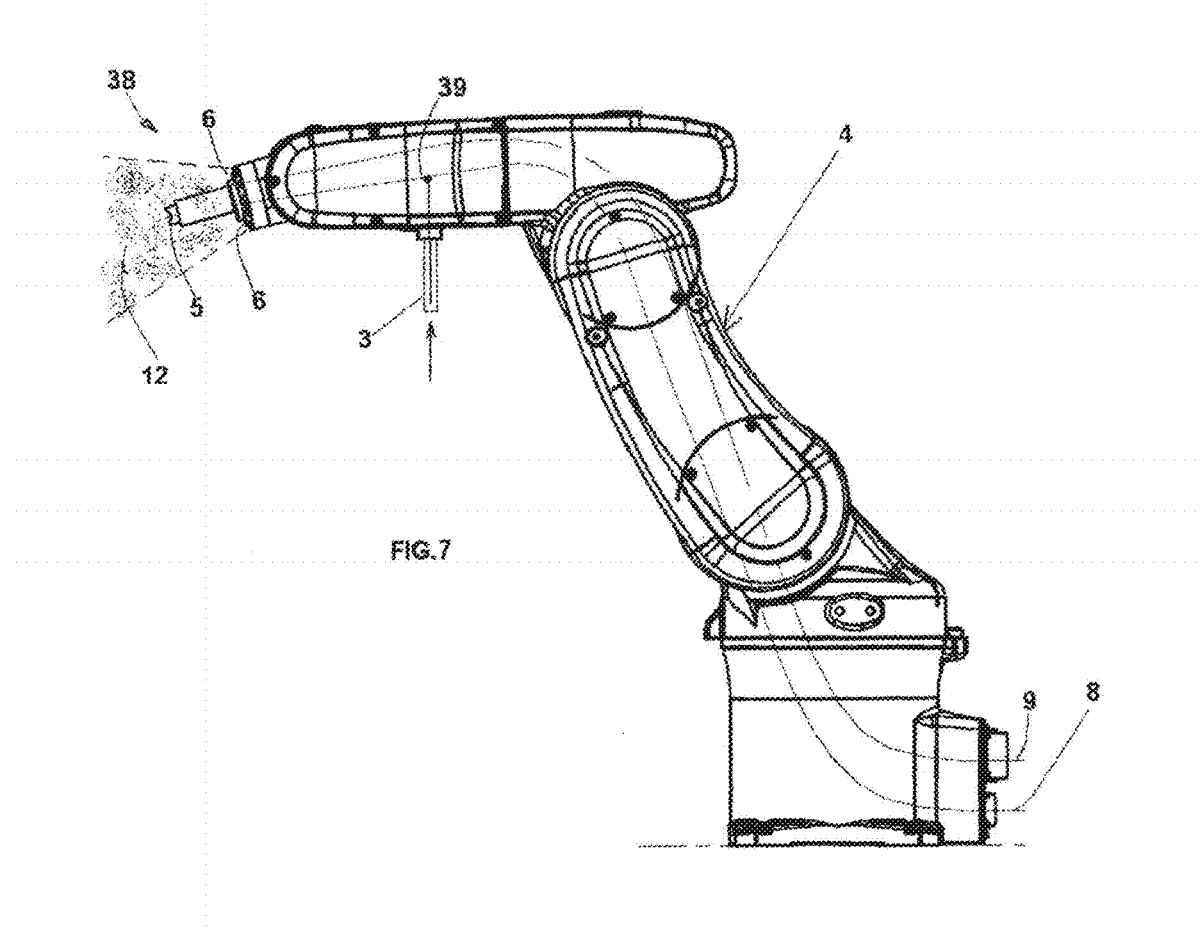
FIG. 7 shows a detail of an example of paint-spray dispenser.

The gun 4 (FIG. 7) is provided with an operative end 38 where there gives out a first nozzle 5 communicating with a first outlet 15 of carrier fluid and with a supply of liquid paint 3. The carrier fluid conveyed by the duct 8 has the function of atomizing the paint in a mixing point 39 and entraining it onto the substrate 1 with a fan of atomized paint 12. The shape of the fan 12 is determined by a second flow of carrier fluid coming out of nozzles 6 set alongside the spray nozzle 5 and communicating by means of the ducts 9 with the second outlet 16 of the control unit 14.

According to the invention, the temperature of two distinct flows 8, 9 of carrier fluid are heated to the same temperature by means of a low-voltage electrical-heating assembly 10 preferably located within the painting area A1 in the proximity of the gun 4 and connected to a regulation and control unit 11 located in the external area A2.

According to the invention, the temperature of two distinct flows 8, 9 of carrier fluid are adjusted and kept to the same temperature by means of temperature conditioning means 10 (heating and/or cooling means comprising by example a chiller) preferably located within the painting area A1 in the proximity of the gun 4 and connected to a regulation and control unit 11 located in the external area A2.

Advantageously, with the solution described, the temperature conditioning means comprise heating device 10 enabling the temperature to be kept constant for the two flows of fluid that reach the spray gun with pressures controlled independently, thus optimizing the painting process consisting of the step of atomization and the step of formation of the fan.

Figure 5:
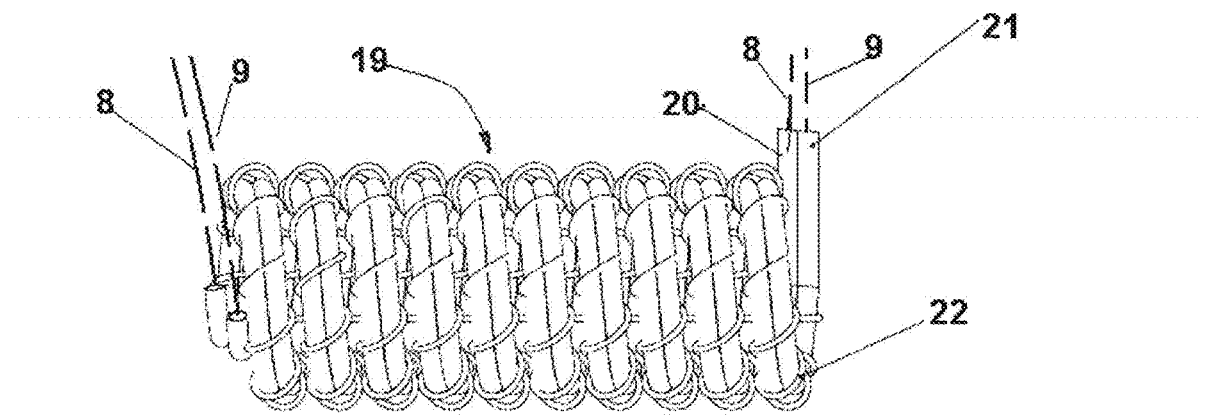
FIG. 5 shows a detail of a two-way heating coil.
Figure 6:
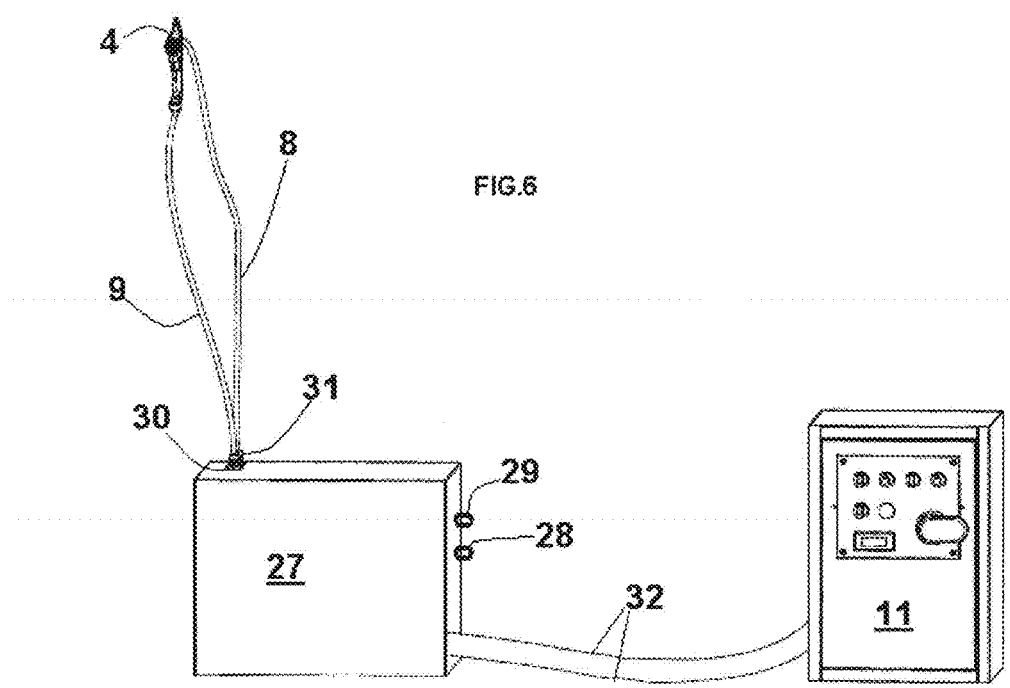
FIG. 6 shows a heating and ionization unit and the corresponding control unit according to the invention.

In a preferred embodiment, the heating assembly comprises a two-way coil 19 constituted by two tubes 20, 21 made of thermally conductive material, for example copper, which are traversed, respectively, by the flows 8, 9 of the carrier fluid, are set in mutual contact, and around which a common electrical resistance 22 is wound, for example a 500-W resistance (FIG. 5) at a temperature ranging from 0° C. to 100° C. supplied by a voltage equal to or less than 48 V.

According to the invention, it is moreover envisaged to equip the apparatus with independent ionization units 17, 18 controlled by said regulation and control unit 11 for electrostatically charging the first and second flows of carrier fluid with negative, or positive, or neutral-state ions.

Advantageously, with this solution it is possible to charge the preheated fluid electrostatically without the latter presenting any interference due to apparatuses for regulating the pressures set upstream of the unit 27, and without the apparatus modifying the pre-set pressure values.

Figure 2:
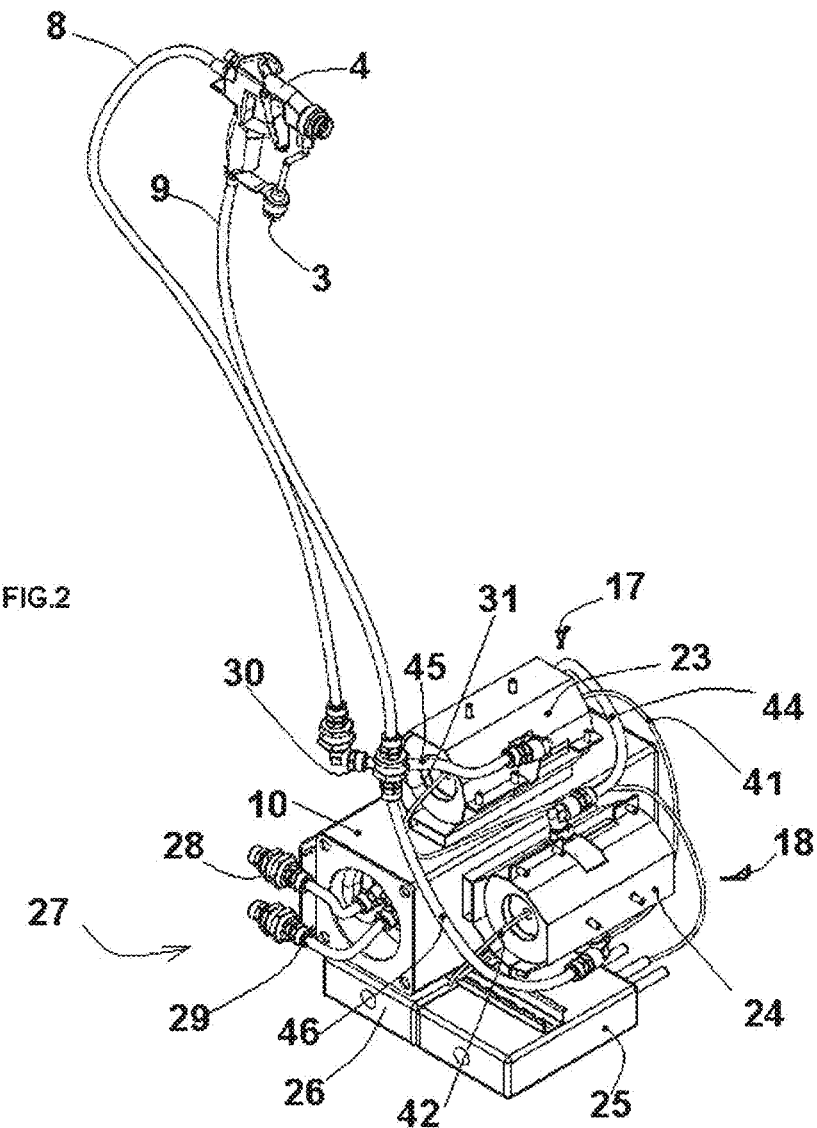
FIG. 2-4 show, respectively, a perspective view, a side view, and a front view of a heating and ionization unit according to the invention.
Figure 3:
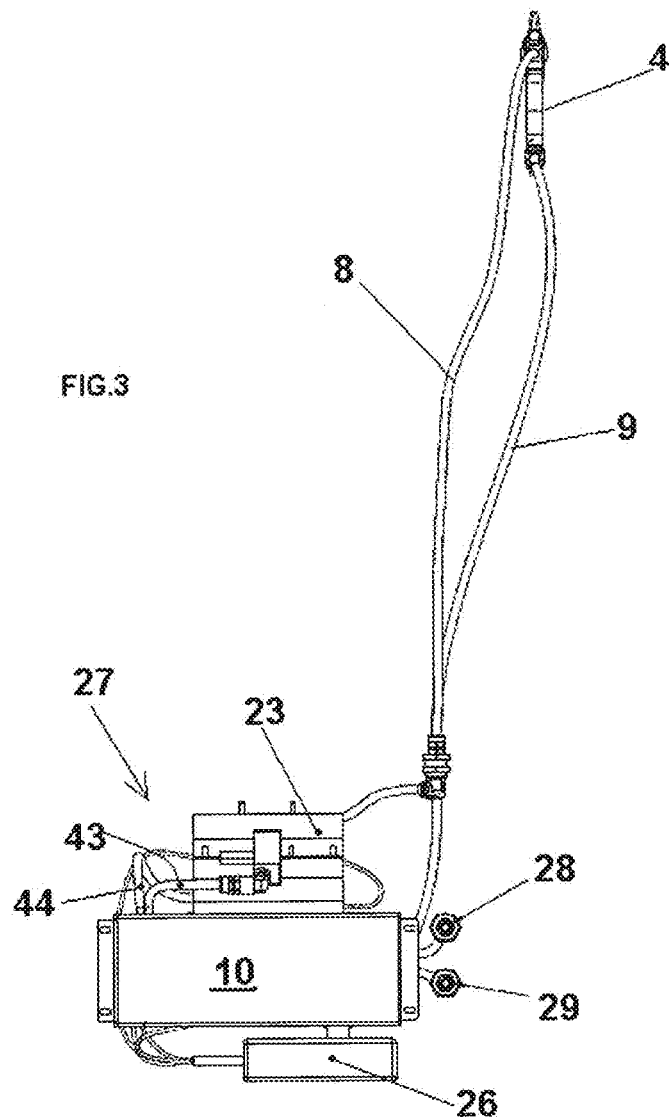
Figure 4:
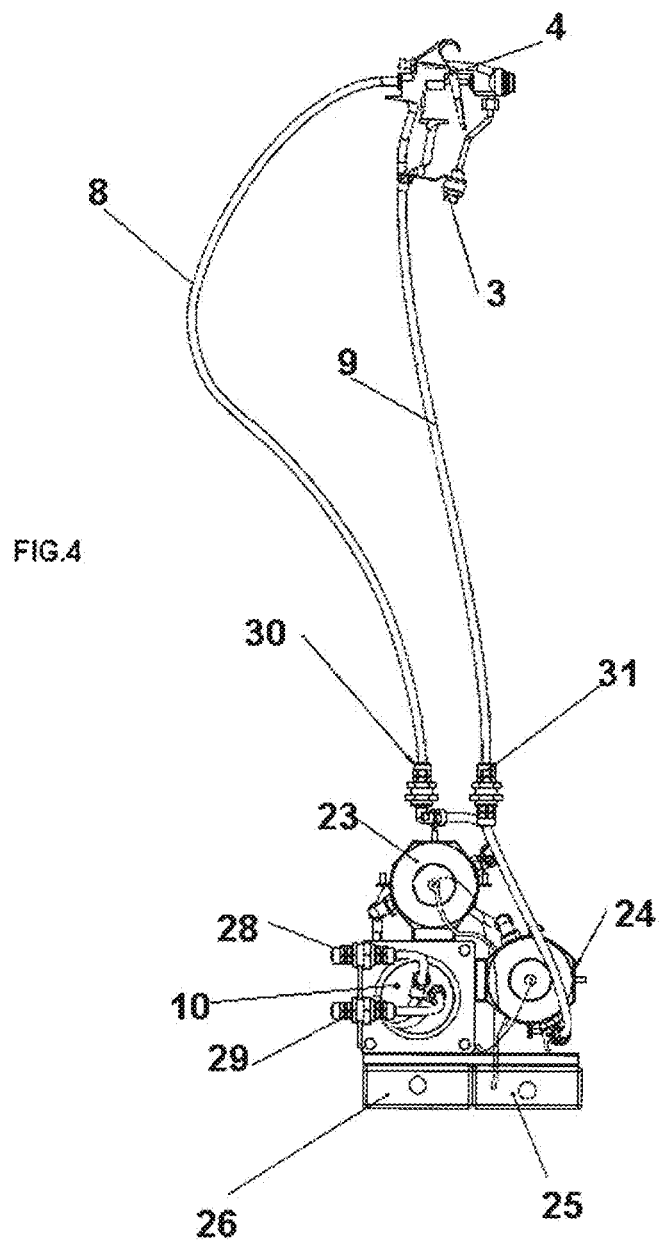

In an example of embodiment (FIG. 2-4), the ionization units 17, 18 comprise, respectively, a first ionization chamber 23 and a second ionization chamber 23, 24 associated to said respective first and second flows, and a first ionizing device 25 and a second ionizing device 26 provided with connections 41, 42 to the ionization chambers for introducing negative, or positive, or neutral-state ions and electrostatically charging said first and second flows of carrier fluid in a uniform or non-uniform way, according, for example, to the substrate to be painted or to the painting environment.

Advantageously, the heating assembly 10 and the ionization units 17, 18, are integrated in a heating and ionization unit 27 provided with inlets 28, 29 and outlets 30, 31 for the flows of entrainment carrier fluid and spray-fan carrier fluid and with connections 32 to the regulation and control unit 11.

In operation of the unit 27, the separate flows of carrier fluid enter the inlets 28, 29 and traverse the device 10, heating up to one and the same temperature regulated and maintained via the regulation and control unit 11.

The flows of heated fluid are introduced into the ionization chambers 23, 24 via ducts 43, 44 connected to the tubes 20, 21 of the assembly 10 and come out therefrom via further ducts 45, 46 that lead to the outlets 30, 31 of the unit 27.

The present invention has been described according to preferred embodiments, but equivalent variants may be devised, without thereby departing from the sphere of protection of the invention.

The invention claimed is:

1. An apparatus for air spray painting of a substrate, the apparatus comprising:
   at least one spray dispenser configured to send a spray fan of liquid atomized paint, the dispenser being provided with at least one first nozzle and at least one second nozzle supplied by respective separate ducts to issue, respectively, a first flow of carrier fluid to entrain the paint and a second flow of carrier fluid, separate from said first entrainment flow, to confine the spray fan externally, said first and second flows being supplied at pressures regulated independently;
   a temperature conditioning system set upstream in the proximity of the dispenser, the temperature conditioning system being configured to condition the temperature of said first and second flows of carrier fluid to the same temperature; and
   a temperature regulation and control system configured to regulate and control the temperature induced in the flows of carrier fluid by said temperature conditioning system.

2. The apparatus according to claim 1, wherein said temperature conditioning system comprises an electrical heater.

3. The apparatus according to claim 1, wherein said temperature conditioning system comprises a cooling system.

4. The apparatus according to claim 2, wherein said heater comprises a two-way coil constituted by two tubes made of thermally conductive material set along said ducts for the first and second flows, set in contact with a common electrical resistance that is wound around the tubes in order to maintain a temperature common to said first and second flows.

5. The apparatus according to claim 1, further comprising first and second independent ionization systems configured to electrostatically charge the first and second flows of carrier fluid by emission of negative, or positive, or neutral-state ions.

6. The apparatus according to claim 5, wherein the emission of ions by said ionization systems is controlled and regulated by said temperature regulation and control system.

7. The apparatus according to claim 5, wherein said ionization systems respectively comprise
   a first ionization chamber and a second ionization chamber associated to said respective first and second flows, and
   a first ionizing device and a second ionizing device configured to introduce into said respective first and second ionization chambers negative, or positive, or neutral-state ions and electrostatically charge said first and second flows of carrier fluid.

8. The apparatus according to claim 5, wherein said temperature conditioning system comprises an electrical heater, and said heater and said ionization systems are integrated in a heating and ionization device provided with inlets and outlets for said first and second flows of carrier fluid and with connections to said temperature regulation and control system unit.

9. The apparatus according to claim 1, wherein said temperature conditioning system comprises an electrical heater, and said heater being supplied with a voltage equal to or less than 48 V.

10. The apparatus according to claim 1 for electrostatic painting of substrates set in a painting area, the apparatus further comprising:
    a supply of a pressurized carrier fluid located in an area outside said painting area;
    a pressure regulation and control system configured to regulate and control the pressures of said carrier fluids, the pressure regulation and control system receiving via a supply duct a flow of carrier fluid from said supply and providing at least one first outlet and one second outlet for carrier fluid at the independently controlled pressures, wherein the at least one spray dispenser is located in said painting area, the at least one spray dispenser being provided with an operative end equipped with the at least one first nozzle communicating by first ducts with said first outlet and communicating with a supply of liquid paint to send onto said substrate a fan of paint spray atomized by the first entrainment flow of carrier fluid, the at least one spray dispenser being provided with the at least one second nozzle set alongside said first nozzle and communicating by second ducts with said second outlet of pressurized carrier fluid to issue the second flow of carrier fluid, separate from said first entrainment flow and capable of forming said spray fan, and wherein the temperature conditioning system is a low-voltage heater located in said painting area.

11. The apparatus according to claim 10, wherein said supply comprises a device configured to supply the flow of carrier fluid constituted by a mixture made up of nitrogen in a range of 80-98%, oxygen in a range of 1-19%, and argon in a range of 1-2% obtained by continuous separation starting from a flow of compressed air taken in from the environment during painting deprived of residual substances.

12. An integrated system for thermal conditioning and ionization of a carrier fluid for electrostatic air spray painting provided with inlets and outlets for a first flow and a second flow of a carrier fluid, the integrated system comprising:

a temperature conditioning system configured to condition the temperature of a first flow of carrier fluid and a second, separate, flow of carrier fluid to the same temperature; and first and second independent ionization systems configured to electrostatically charge the first and second flows of carrier fluid with negative, or positive, or neutral-state ions, wherein said temperature conditioning system and said ionization systems are connected via connections to a temperature regulation and control system configured to regulate and control said temperature and said ionization charges.

13. The integrated system according to claim 12, wherein said temperature conditioning system comprises an electrical heater.

14. The integrated system according to claim 12 wherein said temperature conditioning system comprises a cooling system.

15. The integrated system according to claim 13, wherein:

said electrical heater comprises a two-way coil constituted by two tubes made of thermally conductive material, the tubes being set in contact with a common electrical resistance that is wound around the tubes.

16. The integrated system according to claim 12, wherein:

said ionization systems respectively comprise a first ionization chamber and a second ionization chamber associated to said respective first and second flows, and a first ionizing device and a second ionizing device configured to introduce into said respective first and second ionization chambers negative, or positive, or neutral-state ions and electrostatically charge said first and second flows of carrier fluid.

17. The apparatus according to claim 2, wherein said temperature conditioning system comprises a cooling system.

18. The integrated system according to claim 13, wherein said temperature conditioning system comprises a cooling system.

* * * * *